United States Patent [19]

Harbers, Jr., H. C.

[11] Patent Number: 4,812,630

[45] Date of Patent: Mar. 14, 1989

[54] MANUALLY ACTUABLE, MACHINE, READABLE MENU CARD

[75] Inventor: Harbers, Jr., H. C., Templeton, Calif.

[73] Assignee: Escorp, Inc., San Luis Obispo, Calif.

[21] Appl. No.: 149,492

[22] Filed: Jan. 28, 1988

Related U.S. Application Data

[63] Continuation-in-part of Ser. No. 916,942, Oct. 8, 1986.

[51] Int. Cl.[4] ............ G06K 7/04
[52] U.S. Cl. ............ 235/448; 235/487
[58] Field of Search ............ 235/448, 487

[56] References Cited

U.S. PATENT DOCUMENTS 4,128,757 12/1978 Garner ............ 235/448 X

FOREIGN PATENT DOCUMENTS 2046040 9/1970 Fed. Rep. of Germany ...... 235/448

*Primary Examiner*—Harold I. Pitts
*Attorney, Agent, or Firm*—William W. Haefliger

[57] ABSTRACT

A menu device comprises (a) a card having a transparent section,
(b) indicia on the card listing items to be selected,
(c) bubbles on the card transparent section in alignment with the indicia, the bubbles having positions on the card representative of items to be selected,
(d) each bubble having a first position projecting in one direction outwardly from the plane of the card, and a second position into which it is displaced relative to the plane of the card, by finger pressure, to indicate selection of items corresponding to bubble position on the card.

24 Claims, 5 Drawing Sheets

MANUALLY ACTUABLE, MACHINE, READABLE MENU CARD

This application is a continuation-in-part of Ser. No. 916,942, filed Oct. 8, 1986.

BACKGROUND OF THE INVENTION

This invention relates generally to the selecting and filling of orders, and more particularly to a very simple, re-usable card on which orders can be entered, and which is readable by a machine, or by human eye, to fill orders.

There is need, as for example at fast food take-out establishment, or other order receiving establishment for means to enable rapid conversion of desired orders into groupings ready to be taken out or shipped. A major problem is the time required for the order giver to think through and remember what he desires, as he attempts to quickly convey this information to a clerk. Order changes are frequent as the order giver attempts to state items and/or number of items to the clerk, while he re-thinks his desires and the desires of others accompanying him or her, at the establishment. There is a great deal of time wasted, and the order filling process is slowed, to the inconvenience of those waiting in line to have their orders filled. There is need for means or system that obviates these and similar problems, including the need for a quickly programmable and re-programmable menu device.

SUMMARY OF THE INVENTION

It is a major object of the invention to provide a solution to the above problems, and difficulties, through provision of a menu ordering device easily usable to pre-select total orders of a large number of possible items of merchandise, and enabling changing of item selection, and without requiring a pen or pencil, or permanent deformation, of the device.

Basically, the device comprises:

(a) a card having a transparent section, (b) indicia on the card listing items to be selected, (c) bubbles on the card transparent section and generally in alignment with the indicia, the bubbles having positions on the card representative of, items, or numbers of items or other item data selected, (d) each bubble having a first position projecting in one direction outwardly from the plane of the card, and a second position into which it is displaced relative to the plane of the card, by finger pressure, to indicate selection of items corresponding to bubble position on the card.

As will appear, bubbles are typically arrayed in columns, and indicia are arrayed in a column parallel to the bubble column, and on a label attached to the thin transparent sheet, to assist in stiffening its area near the bubbles, but yet allowing flexing of the card transparent zone carrying the bubbles for ready "clearing", to facilitate re-programming. Such stiffener labels may be attached to opposite sides of the transparent card, and between bubble zones near card edges, as will appear, to facilitate use of both sides of the card for bubbles "programming", by deflection between stable states or positions.

A further object is the provision of a bubble reader, in the form of means forming a card receiving opening into which the card and bubbles thereon are received, with certain selected bubbles displaced as referred, to, for detecting which of the bubbles are so displaced.

A still further object is the provision of a method for using the card, which comprises:

(a) visually reading the indicia on the label to determine which of said items are to be selected, (b) and manually displacing a selected bubble or bubbles in the rows in alignment with selected said items, the selected bubbles corresponding to the desired selected items.

During reading, bubbles typically project away from the user holding the card, and bubble displacement is carried out to finger-displace bubbles toward the user.

These and other objects and advantages of the invention, as well as the details of an illustrative embodiment, will be more fully understood from the following specification and drawings, in which:

DRAWING DESCRIPTION

DETAILED DESCRIPTION

Figure 1:
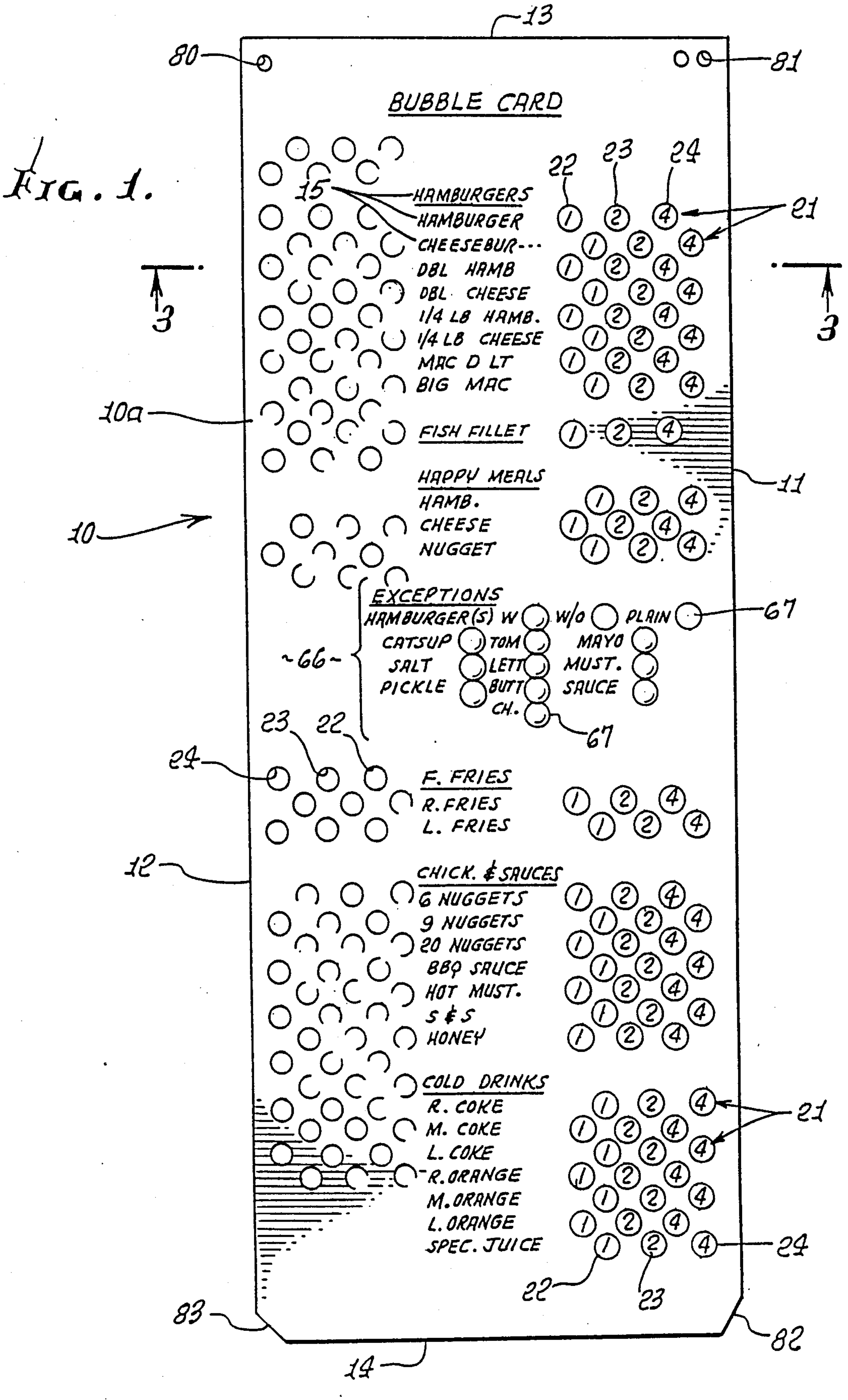
FIG. 1 is a plan view of a card incorporating the invention.

In the drawings, a card 10 is typically rectangular and has opposite faces 10*a* and 10*b*, and edges 11-14. As shown the card is vertically elongated to bear multiple horizontal rows 15 of the indicia, in a column, as for example at least ten rows it may have other forms and shapes. It may be foldable, and bendable, and it is peripherally sized to fit vertically in a shirt or pants pocket so that a customer may conveniently carry it to a store to obtain items or merchandise pre-selected on the card.

Figure 2:
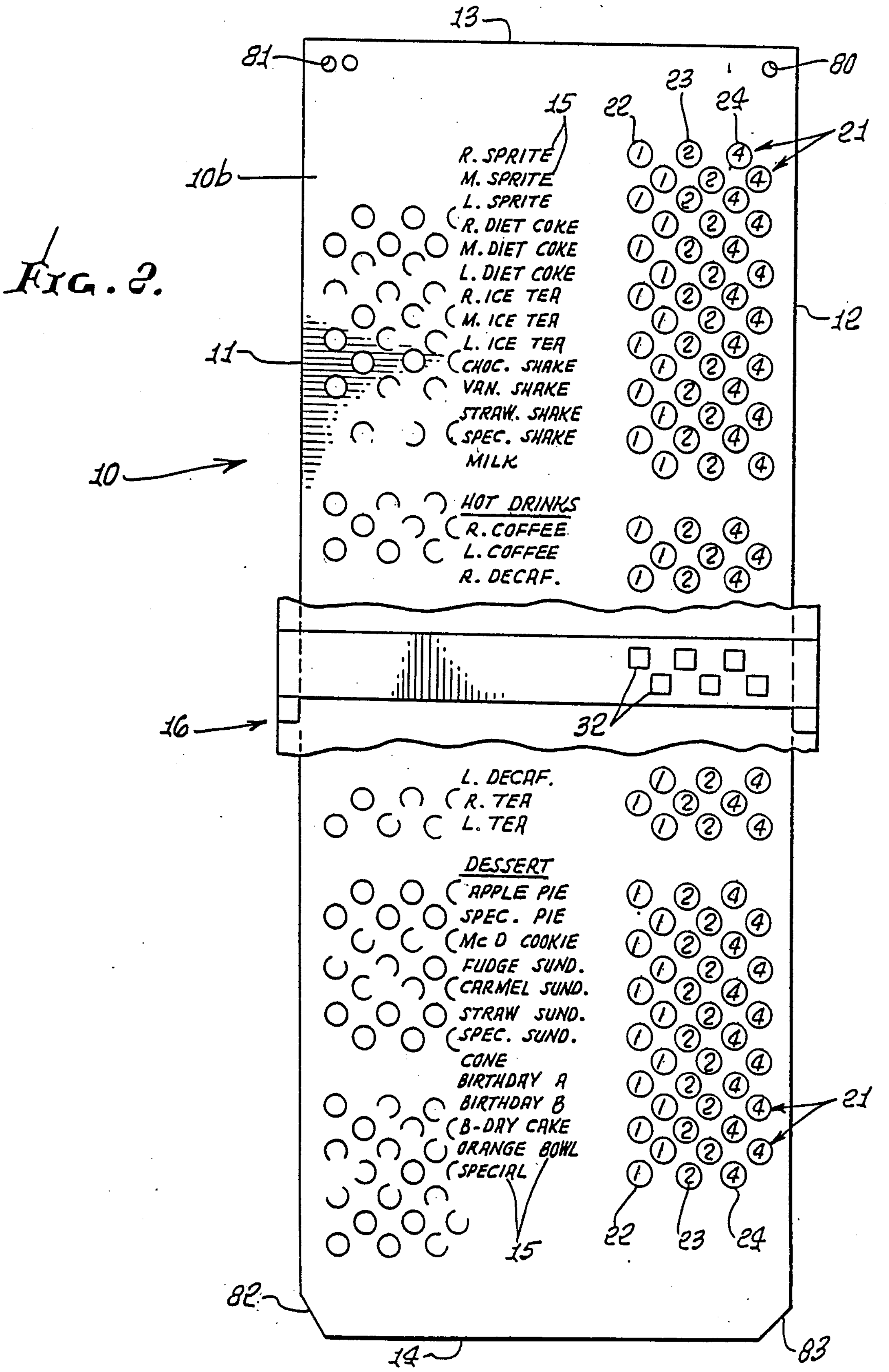
FIG. 2 is a plan view of the back side of the FIG. 1 card (or similar card) incorporating the invention, together with associated bubble sensor apparatus.
Figure 3:
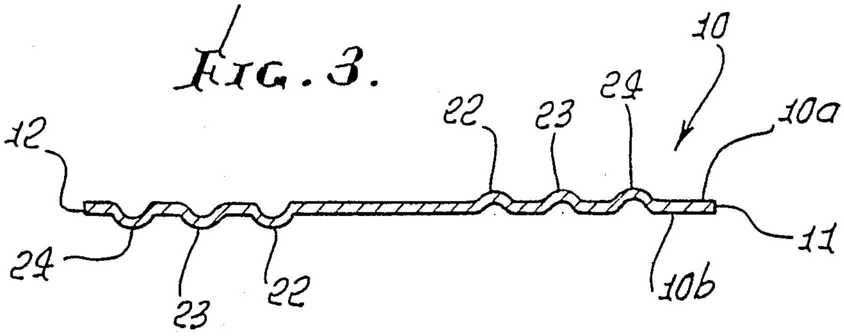
FIG. 3 is a section taken on lines 3—3 of FIG. 1.

Each row of indicia typically indicates an item of merchandise to be selected by the said bearer, and to be detected by a device 16 into which the card is removably receivable, as at the store, the latter for example being represented by a fast food take-out establishment. Thus, the items of merchandise to be selected may include fast food items, as are indicated in FIGS. 1 and 2; however, other items to be selected may appear on the card.

Further in accordance with the invention, rows 21 of bubbles are located on the card in horizontal alignment with the rows of indicia, the bubbles having positions on the card representative of numbers of items to be selected. Preferably there are at least three bubbles 22, 23 and 24 in each row, the three bubbles as shown representing the numbers 1, 2 and 4 of the same items, so that up to seven such items may be selected merely by manipulating one or more of the three bubbles.

Figure 4:
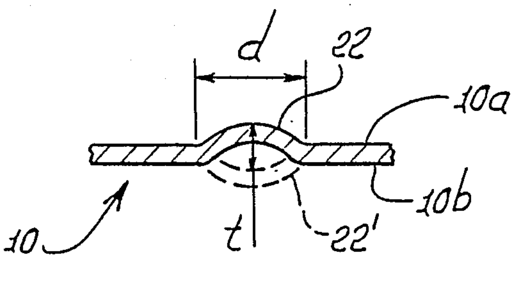
FIG. 4 is an enlarged section showing bubble construction, and multiple positions.

As shown, a typical bubble 22 has a first stable position (see full lines in FIG. 4) projecting upwardly from the plane of the card, and a second stable position 22' into which it is displaced, relative to the plane of the card, by finger pressure, in order to indicate selection of an associated number or numbers of the selected items to be ordered. Thus, if a bubble 22 in the first column is displaced to position 22', one such item is to be ordered; if a bubble 23 in the second column is displaced to a position corresponding to 22', two such items are to be ordered; and if the bubble 24 in the third column is similarly displaced, four such items are to be ordered. The possible configurations are:

| | Items to be ordered |
|---|---|
| Displaced bubble 22 | 1 |
| Displaced bubble 23 | 2 |
| Displaced bubbles 22 and 23 | 3 |
| Displaced bubble 24 | 4 |
| Displaced bubbles 24 & 22 | 5 |
| Displaced bubbles 23 & 24 | 6 |
| Displaced bubbles 22, 23 & 24 | 7 |

Of advantage is the fact that the bubble may be returned to original (up) position, so that one can adjust and re-adjust his total order prior to presenting the card to the bubble "reader" (detector) at the store; and the card is therefore re-usable after it has been "read" at the store, i.e. the user can take it with him for leisurely selection of items to be ordered, as at his home, followed by re-presentation to the card reader at the store for instant reading of the total order. Also, the store clerk can use the card for order filling checkout, i.e. as the items of merchandise or fast food are assembled on a counter, the corresponding displaced bubbles are returned to initial position by finger pressure on them at the reverse side of the card, where the bubbles project outwardly (from the plane of the card, at that reverse side) To assist in this process, the reverse side of the card may bear rows of indicia the same as or similar to the indicia on the front side of the card, so that the clerk can maintain the card in turned-over state and press the displaced bubbles at that reverse side while reading corresponding indicia on the reverse side, as the items are assembled.

The card may advantageously consist of polystyrene so that the bubbles formed integrally with the card, as a one-piece unit, have flexible displaceability between two stable states as described. In order that at least 10 rows of such bubbles and indicia can be assembled on a menu card the bubbles typically have diameter "d" less than ⅜ inch, and such diameter should not be less than 3/16 inch to enable user finger displacement. Also the bubbles should undergo displacement "t" between stable states, where "t" exceeds twice the card (and bubble) thickness. Card thickness is desirably between 0.003 and 0.009 inch, for desired card flexibility, and bubble displaceability between states.

Figure 5:
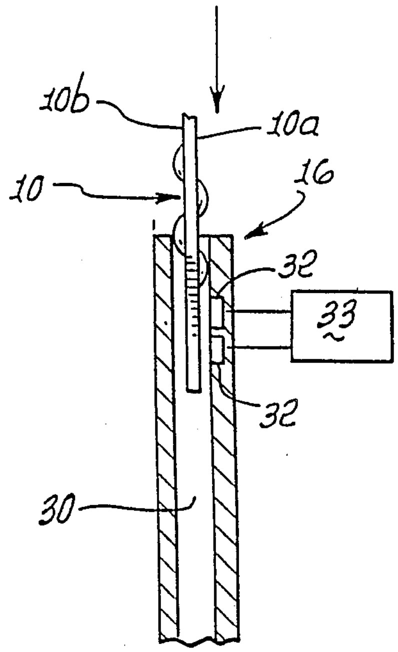
FIG. 5 is a vertical section showing bubble sensor means.

FIGS. 2 and 5 show a card reader 16 defining a slot 30 into which a card is received during bubble reading or detecting. Proximity or other type detectors are shown at 32, to read the presence of displaced bubbles as the card travels endwise in the slot. Box 33 represents a circuit connected with the detectors 32 connected to convert the detector signals corresponding to displaced bubbles into other signals such as numbers on a display seen by the clerk to enable assembly of the correct numbers of selected items. The reader and detector can take many different forms.

It will be noted that successive rows of bubles in the column are staggered. This allows greater vertical concentration of bubbles, while maintaining distances or gaps between the bubbles in successive rows, required by the reader.

Also, "1" bubbles can have one color, "2" bubbles another color, and "4" bubbles a third color, to aid in bubble selection to correspond to numbers of items desired.

Referring again to FIG. 1, area 66 incorporates "exceptions" to the other items on the card; i.e., each listed item (catsup, etc.) in area 66 has associated with it only one bubble, as at 67 for example, since only one order of that item is made. Such bubbles 67 are of the same configuration and operation as the bubbles described above.

With reference to FIG. 2, the rear side of the card shows a second column of bubbles 21, to the right of the additional rows of indicia 15, complementing those indicia shown in FIG. 1. Maximum use of space on the card is thereby made, by having the indicia in a central column on each side of the card, and bubbles in a column to the right of the indicia column. Staggering of bubbles, as shown, adds further to space utilization, since it enables vertical condensation of the indicia rows. To the left of the indicia column on each side appear the rear sides of the bubbles that are associated with indicia on the opposite side of the card.

Associated with corners of the cards are means (bevels, of different angularity, or holes) that are detectable by the sensor apparatus to orient the sensor circuitry to the card orientation, as inserted into the sensor. Thus, either end of the card may be inserted into the sensor, and the card may face up or down. See holes 80 and 81, and beads 82 and 83.

Figure 6:
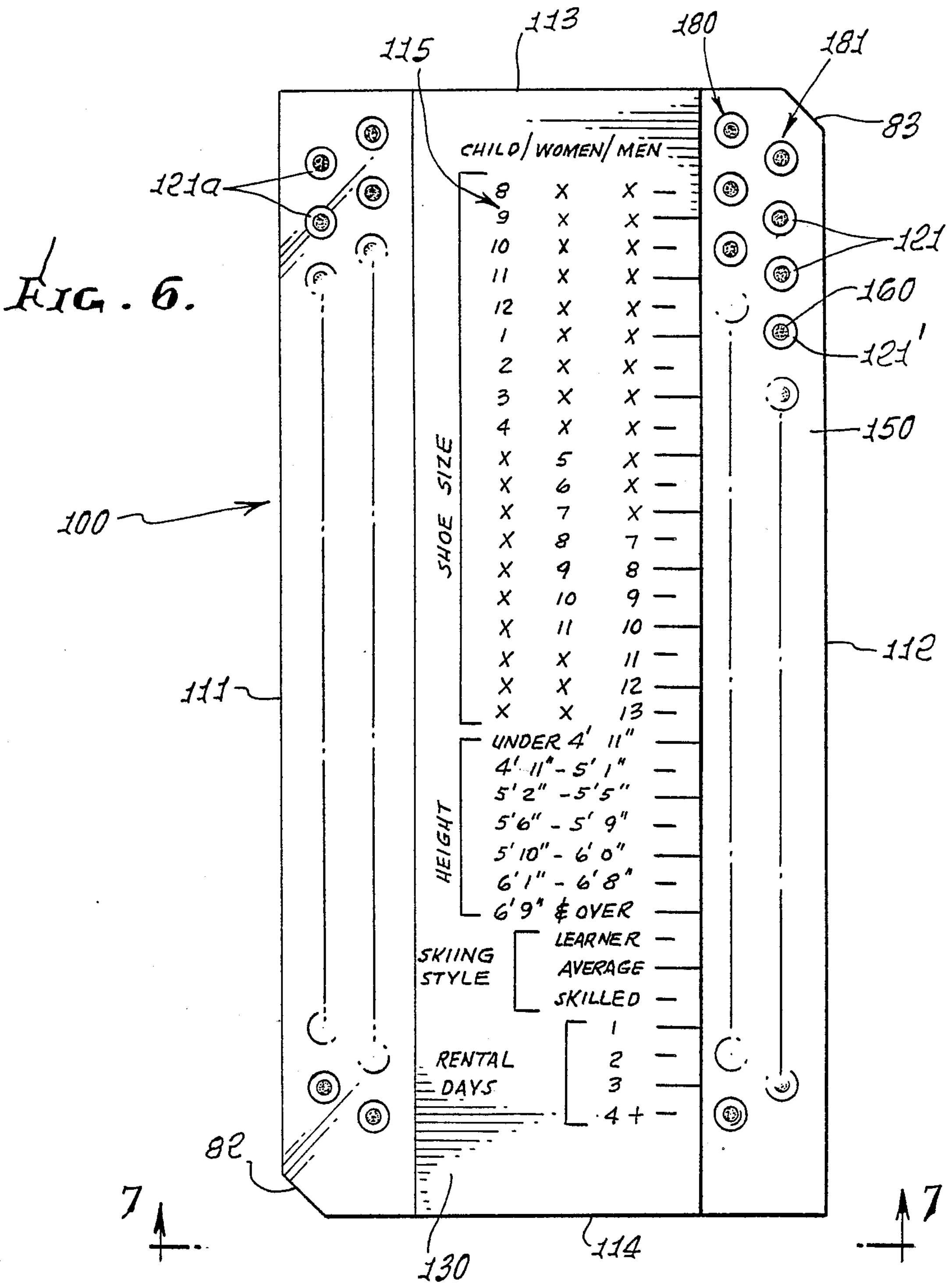
FIG. 6 is a plan view of a modified card.
Figure 7:
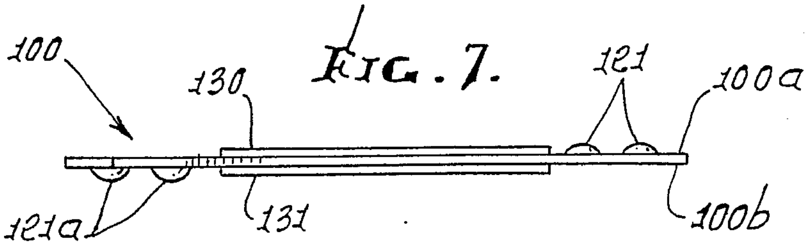
FIG. 7 is an edge view on lines 7—7 of FIG. 6.
Figure 8:
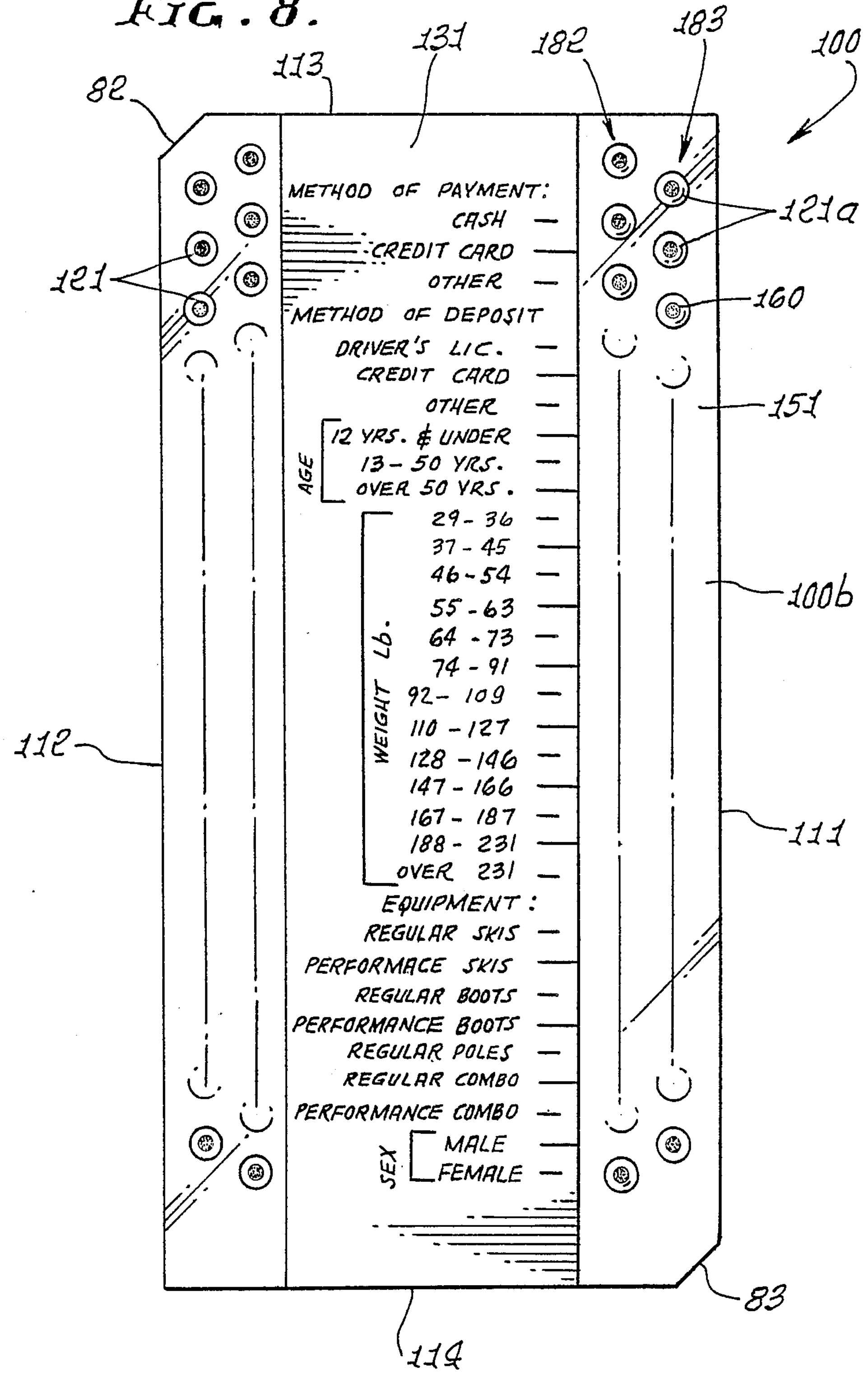
FIG. 8 is a plan view of the back side of the FIG. 6 card.

In FIGS. 6–8, a modified card 100 is typically rectangular and has opposite faces **100*a* and 100*b*, and edges 111–114. As shown, the card is vertically elongated to bear multiple horizontal rows 115 of indicia, in a column, as for example at least ten rows but it may have other forms and shapes. It may be foldable, and bendable, and it is peripherally sized to fit vertically in a shirt or pants pocket so that a customer may conveniently carry it to a store to obtain items of merchandise preselected on the card. The indicia are on thin labels 130 and 131** bonded to opposite sides of the card, the card typically being formed of transparent plastic material, which is flexible, and the thin labels, typically of paper, stiffen the card for ease and accuracy of handling and bubble selection.

Each row of indicia typically indicates an item of merchandise, and/or its size, to be selected by the said bearer, and/or terms of payment, or other information regarding such items. See the representative items listed on the two labels, and in column sequence.

Further, in accordance with the invention, bubbles 121 are located on the card to the right of, and in horizontal alignment with the rows of indicia, the bubbles having positions on the card representative of items, or numbers of items to be selected. Two columns 180 and 181 bubbles are shown, the bubbles staggered, as illustrated.

A typical bubble 121' has a first stable position (as previously described for bubbles 22) projecting downwardly from the plane of the card, and a second and upward stable position into which it may be displaced, relative to the plane of the card, by finger pressure, in order to indicate selection of an item size or other associated date.

Of advantage is the fact that the bubble may be returned to original (down) position, so that one can adjust and re-adjust his total order prior to presenting the card to the bubble "reader" (detector), as at the store; or other location and the card is therefore re-usable after it has been "read", i.e. the user can take it with him for leisurely pre-selection of items to be ordered, as at his home, followed by re-presentation to the card reader at the store for instant reading of the total order. Also, the store clerk can use the card for order filling checkout, i.e. as the items of merchandise or fast food are assembled on a counter, the corresponding displaced bubbles are returned to initial position by finger pressure run along the reverse side of the card, where the bubbles project outwardly (from the plane of the card, at that reverse side). As the card section is run between the user's thumb (on the upper side), and first two fingers (on the lower side) the section flexes to an extent that bubbles are restored to first state. Thus, the device is an erasable, flexible, re-programmable, keyboard. The reverse side of the card may bear other rows of indicia as on label 131, and rows 182 and 183 of bubbles 121*a* (like bubbles in rows 180 and 181) are formed to the right of the indicia on label 131, in horizontal alignment with that indicia, as shown. Bubble manipulation is the same as described above.

The card transparent section or sections (forming the bubbles) may advantageously consist of polystrene so that the bubbles formed integrally with the card, as a one-piece unit, have flexible displaceability between two stable states as described.

The card sections 150 to the right of label 130 in FIG. 6, and 151 to the right of label 131 in FIG. 8, are transparent. In order that at least 10 rows of such bubbles and indicia can be assembled on a menu card the bubbles typically have diameter "d" less than ⅜ inch, and such diameter should not be less than 3/16 inch to enable user finger displacement. Also the bubbles should undergo displacement "t" between stable states, where "t" exceeds twice the card (and bubble) thickness. Card thickness is desirably between 0.003 and 0.009 inch, for desired card flexibility, and bubble displaceability between states.

Figure 9:
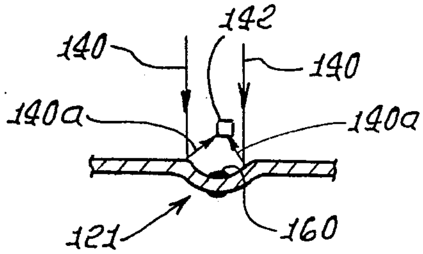
FIGS. 9 and 10 show bubble reading.
Figure 10:
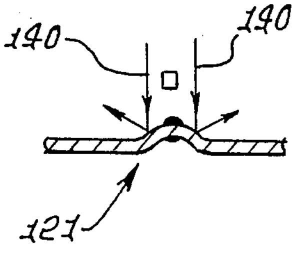

The FIGS. 6–8 card may be read by the card reader 16 defining a slot 30 into which a card is received during bubble reading or detecting. Proximity or other type detectors are shown at 32, in FIGS. 2 and 7 to read the presence of displaced bubbles as the card travels endwise in the slot. Box 33 represents a circuit connected with the detectors 32 connected to convert the detector signals corresponding to displaced bubbles into other signals such as numbers on a display seen by the clerk to enable assembly of the correct numbers of selected items. The reader and detector can take many different forms. FIG. 9 shows a selected bubble during reading, with parallel incident light rays 140 reflected convergently at 140*a* toward a reader sensor 142. The crests of the bubbles may be colored or darkened to better reflect light, and also enable the user to better view the bubbles during selection. See darkened "dots" 160. FIG. 10 shows a non-selected bubble during reading, with parallel incident light rays 140 reflected divergently and therefore not sensed at a threshold level, by the sensor.

Associated with corners of the card of FIGS. 6–8 are means (bevels, of different angularity, or holes) that are detectable by the sensor apparatus to orient the sensor circuitry to the card orientation, as inserted into the sensor. Thus, either end of the card may be inserted into the sensor, and the card may face up or down. See bevels and 83.

Also provided is a means responsive to over-center bubble displacement to visually quickly indicate the state of such displacement. Examples are:

(i) visible relative displacement of lines or dots, etc., on the bubble surface. See for example dots 210 inscribed on the bubble surface 211 in FIG. 4, and which separate further apart (210') in displaced bubble position 22'.

(ii) a "checker" shaped design on the bubble surface that becomes warped due to bubble displacement.

(iii) a change in color or opacity of the bubble surface due to its displacement. Plastic materials are known, which produce this effect due to a change in stress in the plastic.

I claim:

1. A menu device, comprising (a) a card having a transparent section, (b) indicia on the card listing items to be selected, (c) bubbles on the card transparent section and generally in alignment with said indicia, the bubbles having positions on the card representative of items to be selected, (d) each bubble having a first position projecting in one direction outwardly from the plane of the card, and a second position into which it is displaced relative to the plane of the card, by finger pressure, to indicate selection of items corresponding to bubble position on the card.

2. The device of claim 1 wherein bubbles are arranged in at least one longitudinal column.

3. The device of claim 2 wherein the indicia are arranged in a column parallel to the bubble column, and including a label on the card carrying the indicia.

4. The device of claim 3 wherein the bubbles are in two columns, the bubbles in one column staggered relative to the bubbles in the second column.

5. The device of claim 1 wherein the bubbles are unitary with the card.

6. The device of claim 5 wherein the bubbles are of substantially the same diameter, which is less than about ½ inch.

7. The device of claim 5 wherein the bubbles have diameter between 3/16 and ⅜ inch.

8. The device of claim 5 wherein the bubbles have thickness of between 0.003 and 0.008 inch.

9. The device of claim 1 wherein the card consists of a thin transparent and flexible sheet with which the bubbles are integral, and a stiffener label attached to the sheet, the indicia being on the stiffener label.

10. The device of claim 9 wherein the transparent sheet and bubbles consist of polystyrene.

11. The device of claim 1 including means forming a card receiving opening into which the card and bubbles thereon are removably received, with certain selected bubbles displaced as referred to, for detecting which of the bubbles are so displaced.

12. The method of using the device of claim 1 by a reader, which includes:

(i) visually reading said indicia to determine which of said items are to be selected, (ii) and manually displacing a selected bubble or bubbles in alignment with selected said items, the selected bubbles corresponding to the desired selected items.

13. The method of claim 12 wherein bubbles during said reading project away from a plane defined by the card, and away from the reader, and said displacing of bubbles is carried out to displace the bubbles toward the reader.

14. The method of claim 12 including detecting which bubble has been displaced in order to fill the order of said items.

15. The method of claim 14 including returning the bubbles to initial position as orders for selected items are filled.

16. The device of claim 9 wherein said label is on one side of the sheet, and including a second stiffener label attached to the opposite side of the sheet.

17. The device of claim 16 wherein the bubbles are arrayed in two columns, one column of bubbles to the right of indicia on the label on one side of the card, and another column of bubbles to the right of indicia on the second label on the opposite side of the card.

18. The device of claim 12 including a bubble reader into which the card is insertible, and means on the card to be detected by circutiry associated with said reader to sense the orientation of the card relative to the reader.

19. The device of claim 18 wherein said means comprises different configurations of the card at card corners.

20. The device of claim 1 including a visual indicator associated with the bubble surface that changes in shape, design or color in response to bubble displacement between said positions.

21. A menu device, comprising (a) a card, (b) indicia on the card listing items to be selected, (c) bubbles on the card and generally in alignment with the indicia, the bubbles having positions on the card representative of items to be selected, (d) each bubble having a first position projecting in one direction outwardly from the plane of the card, and a second position into which it is displaced relative to the plane of the card, by finger pressure, to indicate selection of items corresponding to bubble position on the card, (e) the card consisting of a thin flexible sheet with which the bubbles are integral, and a first stiffener sub-sheet attached to the sheet, the indicia being on the stiffener sub-sheet.

22. The device of claim 21 wherein the bubbles are off-set from the first sub-sheet.

23. The device of claim 22 including a second stiffener sub-sheet attached to the sheet.

24. The device of claim 23 wherein said first sub-sheet is at one side of the sheet, and the second sub-sheet is at the opposite side of the sheet, both sub-sheets off-set from bubbles on the sheet.

* * * * *